United States Patent [19]
Godard

[11] 4,011,525
[45] Mar. 8, 1977

[54] GAS LASER GENERATOR

[75] Inventor: Bruno Godard, Gif sur Yvette, France

[73] Assignee: Compagnie Generale d'Electricite, Paris Cedex, France

[22] Filed: Dec. 31, 1975

[21] Appl. No.: 645,775

[30] Foreign Application Priority Data

Jan. 21, 1975 France .............................. 75.01795

[52] U.S. Cl. .......................... 331/94.5 PE; 330/4.3; 343/840
[51] Int. Cl.² ...................... H01S 3/097; H01S 3/22
[58] Field of Search ................... 331/94.5; 330/4.3; 333/21, 31; 343/781, 783, 785, 840

[56] References Cited
UNITED STATES PATENTS 3,430,246  2/1969  Le Parquier et al. ............. 343/840

3,821,664  6/1974  Godard et al. ............... 331/94.5 G

*Primary Examiner*—Robert J. Webster
*Attorney, Agent, or Firm*—Sughrue, Rothwell, Mion, Zinn & Macpeak

[57] ABSTRACT

Gas laser generator comprising a gaseous active medium, at least one electric excitation line formed by an insulating plate inserted between a first and second metallic plate, the first plate having a slot enclosing the gaseous medium, a circuit for setting up a progressive current wave in the line. The plates are cut in the shape of superimposed half parabolas. A variant consists in producing the generator in the form of two half parabolas such as above but insulated from each other and brought to different potentials. The invention is implemented in high-power lasers.

7 Claims, 2 Drawing Figures

GAS LASER GENERATOR

BACKGROUND OF THE INVENTION

1. Field of the Invention

The present invention concerns gas lasers in which a stimulated emission is obtained subsequent to an electric discharge in a gaseous active medium.

2. Description of the Prior Art

Gas lasers comprising a longitudinal cavity containing the active gas and in which the electric discharge is obtained by means of a progressive current wave, propagating in the active medium from one end to the other of the cavity with a speed equal to that of the propagation of a stimulated light emission in that cavity are known.

Such gas lasers comprise a flat electric line, consisting of an insulating plate inserted between a first and second metallic plate brought to different potentials and excitation means for generating a discharge wave in that line.

The gaseous active medium is arranged in a longitudinal slot formed in one of the metallic plates of the line, on the path of the discharge wave.

To great advantage, the edges of the plates are in the shape of parabolas whose axis forms an angle α greater than zero with the axis of the slot.

Moreover, the progressive current wave is generated by means of a circuit suitable for setting up a substantially punctual discharge between the said metallic plates at the level of the focusses of the parabolas.

Nevertheless, it has been observed that in such lasers, the progressive wave of the current can have irregularities in propagation in the said active medium, this resulting in disturbances in the stimulated emission in the cavity.

Such a disadvantage, which appears after a certain period of operation, results more particularly from a variation in the electric properties between the portions of the metallic plates arranged on either side of the axis of the parabolas.

The present invention makes it possible to overcome such a disadvantage and it concerns a new structure of gas laser generator having strictly stable operation while making it possible to obtain an emission of coherent light having high power.

The invention therefore has as its object a laser generator comprising:
 a gaseous active medium;
 at least one electric excitation line formed by an insulating plate inserted between a first and second metallic plate which are parallel to each other, the said first metallic plate having at least one slot separating it into two distinct parts;
 means for maintaining a gaseous active medium in the said slot comprising a longitudinal insulating blade closing the slot and fixed on the said two parts of the first metallic plate;
 a circuit for setting up a substantially punctual discharge between the said metallic plates suitable for generating a progressive current wave in the said line, characterized in that at least said metallic plates are each cut in the shape of a half parabola, the pseudo-focusses as well as the pseudo-apexes of those half parabolas being respectively arranged on a same straight line perpendicular to the plane of the plates, the rectilinear part of the said half parabola forms an angle α which is greater than zero with the said slot, and the circuit means for setting up a discharge generating said progressive current wave discharges at the level of the pseudo-focusses of the said half parabolas.

BRIEF DESCRIPTION OF THE DRAWINGS

The invention is described hereinbelow by way of illustration, the example given thereof having no limiting character, with reference to the accompanying drawings in which.

DESCRIPTION OF THE PREFERRED EMBODIMENTS

Figure 1:
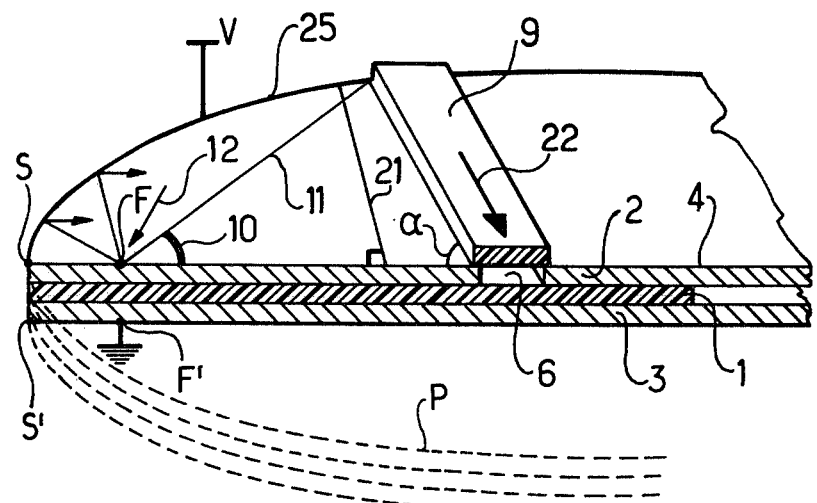
FIG. 1 is a perspective view of a first embodiment of a laser generator according to the invention.

FIG. 1 shows, therefore, a first embodiment of a laser generator comprising an electric excitation line constituted by an insulating plate 1 arranged between a first metallic plate 2 and a second plate 3 brought to different potentials, in this case, V and 0 respectively.

These plates are cut in the shape of half parabolas limited, of course, by a parabolic branch 25 and by the axis 4 of the whole parabola whose missing part is materially shown by the dotted lines P. The focusses and the apexes of the parabolas which are assumed to be whole are arranged respectively on straight lines perpendicular to the plane of the plates (not shown).

Consequently, the figure shows the pseudo focusses and pseudo apexes of the metallic plates 2 and 3 as F, F', S, S' respectively.

The plate 2 has a slot 6 separating it into two distinct parts in which a gaseous active laser medium is maintained.

In the case of air at atmospheric pressure, it is not necessary to close the gas recess. In the contrary case, the gaseous medium can be enclosed by means of an insulating blade or strip 9 arranged facing the slot 6 and fixed thereto, by cementing the blade, for example, on the two edges of that slot. The ends of the gas recess are closed by two ports in a known manner (not shown).

The angle α is chosen so that cosine α be equal to the ratio between the propagation speed of a discharge wave in the line in the direction defined by the axis 4 and the propagation speed of a light emission in the direction of the slot 6.

A reflector 10, constituted for example by a cutaway part of the plate 2 in the shape of an arc of a circle, centred on the point F, is arranged on the opposite side to S in relation to the focus F. Its transversal dimensions are limited substantially by the straight line 11 joining the point F to one of the ends of the slot 6 and by the axis 4.

Moreover, a diagram has been given at 12 of a circuit for setting up a discharge suitable for generating a progressive current wave in the flat electric line.

Such a laser generator operates as follows:

At a given instant, the circuit 12 for setting up a discharge emits a discharge between the plates 2 and 3 thus generating a discharge wave at the level of the pseudo focusses F and F' of the half parabolas.

The discharge wave thus generated and comprised in the angle defined by the straight line 11 and the axis 4 is reflected by the reflector 10.

All the waves emitted at the level of the pseudo focus F are therefore directed towards the half parabola and are reflected at its periphery; it is known that the parabola is perfectly stigmatic for two conjugate points: its focus and infinity. The wave surface coming from F and reflected by the half parabola is therefore a perfectly plane wave surface perpendicular to the axis 4 and shown by its line 21.

The progressive discharge wave 21 therefore reaches successively, in the direction of the arrow 22, the atoms or the molecules of the active gas. The stimulated light emission is therefore effected from one end to the other of the slot 6 in the direction of the arrow 22 at the same speed as the progressive wave 21 in the direction of that slot. That condition makes it possible to obtain a very powerful coherent laser radiation at the output of the slot 6.

The rising time of the discharge wave front is, to great advantage, less than twice the propagation time of a discharge wave in the flat line between the pseudo focus F and the pseudo apex S of the parabola (That time is, for example, in the order of one nanosecond).

Figure 2:
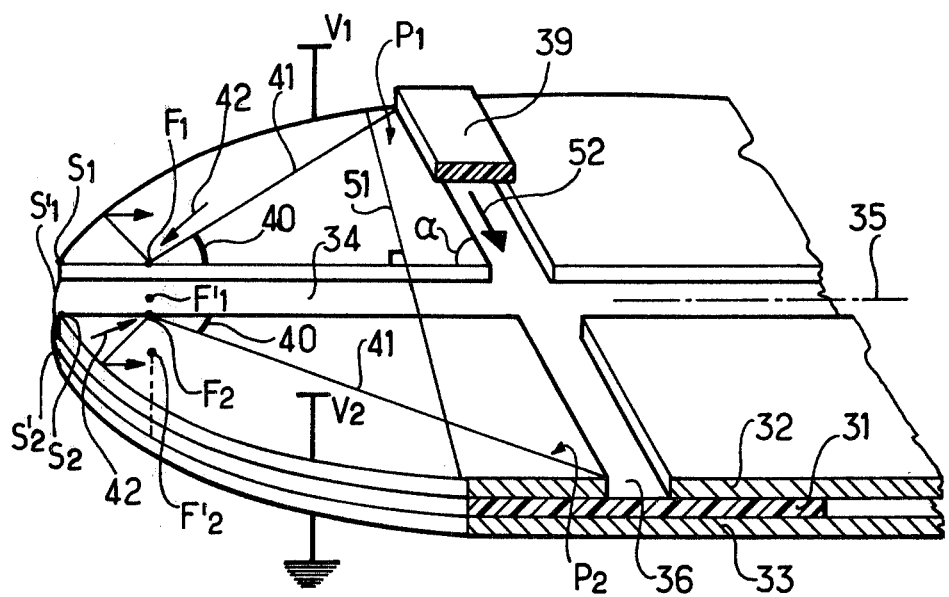
FIG. 2 is a perspective view of a second embodiment of a laser generator according to the invention.

FIG. 2 illustrates, according to a second embodiment, a laser generator comprising two half parabolas P1 and P2 which are substantially identical to each other and are such as described with reference to FIG. 1.

Each of them therefore constitutes an electric excitation line constituted by an insulating plate 31 arranged between a first metallic plate 32 and a second metallic plate 33.

Nevertheless, those two half parabolas P1 and P2 are separated from each other while being connected together by means of the single insulating plate 31, the latter therefore being in the shape of a parabola having a surface slightly greater than twice the surface of the half parabolas. In other words, the metallic plates 32 and 33 of each of the half parabolas are separated and electrically insulated from each other by a space such as the space 34 of the plate 32, the space of the lower plate 33 not being shown in the figure.

Moreover, the focusses of the half parabolas P1 and P2 have been designated by F1, F'1 and F2, F'2 and the apexes have been designated by S1, S'1 and S2, S'2, respectively, arranged in each half parabola and respectively on straight lines perpendicular to the plane of the plates.

The plate 32 of each half parabola has a slot 36 separating it into two distinct parts in which an active laser medium is maintained.

As in the case of FIG. 1, in the case of air at atmospheric pressure, it is not necessary to close the gas recess. In the contrary case, the gaseous medium can be enclosed by means of an insulating blade or strip 39 arranged facing the slot 36 and fixed, by cementing it, for example, to the two edges of that slot. The ends of the gas recess are closed by two windows (not shown) in a known way.

The angle $\alpha$ is likewise chosen so that cosine $\alpha$ be equal to the ratio between the speed of propagation of a discharge wave in the half parabolas in the direction defined by the axis 35 and the propagation speed of a light emission in the direction of the slot 36.

Each of the half parabolas comprises, as in the preceding embodiment, a reflector 40 constituted, for example, by a cutaway part of the plate 32 in the shape of an arc of a circle centered on the pseudo focusses F1 or F2 and arranged on the opposite side to the pseudo apex in relation to the said pseudo focus. The transversal dimensions of each of the reflectors 40 are limited substantially by the rectilinear sides of the half parabolas and the straight line 41 joining the pseudo focus to one of the ends of the slot 36.

Moreover, a diagram has been given at 42 of a circuit for setting up a discharge suitable for generating a progressive current wave in the two half parabolas P1 and P2.

Moreover, the metallic plate 32 of the half parabola P1 is brought to a potential V1 whereas the metallic plate 32 of the half parabola P2 is brought to a potential V2, the plates 33 of the half parabolas being brought to a zero potential.

The operation of such a laser generator is substantially similar to that described with reference to FIG. 1.

At a given instant, the circuit for setting up a discharge 42 emits a discharge between the plates 32 and 33 of the two half parabolas P1 and P2 simultaneously at the level of their pseudo focusses F1 and F2 thus generating a discharge wave in said half parabolas.

The discharge wave thus generated in each half parabola and comprised in the angle defined by the straight line 41 and the rectilinear part limiting the space 34 is reflected by the reflector 40.

All the waves emitted at the level of the pseudo focusses are therefore directed towards the corresponding half parabola and are reflected at its periphery. The wave surface coming from F1 and F2 and reflected by the half parabola is therefore a perfectly plane wave surface perpendicular to the axis 35 and shown by its trace 51.

The progressive discharge wave therefore reaches successively, in the direction of the arrow 52, the atoms or the molecules of the active gas. The emitting of stimulated light is therefore effected from one end of the slot 36 to the other in the direction of the arrow 52 at the same speed as the progressive wave 51 in the direction of that slot. That condition makes it possible to obtain a very powerful coherent laser radiation at the output of the slot 36.

The rising time of the discharge front is, to great advantage, less than twice the propagation time of a discharge wave in the half parabolas between the respective pseudo focusses and the pseudo apexes (that time is, for example, in the order of one nanosecond).

It should be observed that in the case where a certain disturbance in the stimulated emission is noted, such a disadvantage can be obviated by adjusting the difference between the potentials V1 and V2 so that in the two half parabolas P1 and P2, the current wave propagates in a strictly identical way, thus providing a coherent light emission which is perfectly homogeneous, while having high power.

I claim:

1. In a laser generator comprising: a gaseous active medium; at least one electric excitation line formed by an insulating plate inserted between first and second parallel metallic plates, said first metallic plate having at least one slot separating it into two distinct parts; means for maintaining a gaseous active medium in said slot comprising a longitudinal insulating strip closing the slot and fixed to the said two parts of the first metallic plate; and circuit means for setting up a substantially punctual discharge between said metallic plates suitable for generating a progressive current wave in said line, the improvement comprising:

each said metallic plate comprising at least one section in the shape of a half parabola with pseudofocusses as well as the pseudo-apexes of those half parabolas being respectively arranged on the same straight line perpendicular to the plane of the plates, the rectilinear part of said half parabola forming an angle $\alpha$ which is greater than zero with said slot, and wherein said circuit means sets up said discharge at the level of the pseudo-focusses of said half parabolas generating said progressive current wave.

2. The generator according to claim 1, wherein: said metallic plates, as well as said insulating plate, comprise one section in the shape of a single half parabola, and said generator further comprises means for bringing said first metallic plate to a potential different from that of said second metallic plate.

3. The generator according to claim 1, wherein: said metallic plates are each cut into two sections forming two half parabolas, said insulating plate being in the shape of a full parabola having a surface area slightly greater than twice the surface of each half parabola, each metallic plate of a half parabola being electrically insulated from the neighbouring metallic plate of the other half parabola, such that it is possible for one of said half parabolas of the first metallic plate to be brought to a potential different from that to which other half parabola of the first metallic plate is brought, and said generator further comprises means for bringing the second metallic plate half parabolas, to substantially zero potential.

4. The generator according to claim 3, wherein: said circuit means for setting up a substantially punctual discharge between said metallic plates comprises means for generating said progressive current wave simultaneously at the level of the pseudo-focusses of each half parabola.

5. The generator according to claim 1, wherein: the recess defined by said slot and said insulating plate is closed at its ends by two transparent insulating windows for an emission radiation of said gas.

6. The generator according to claim 1, wherein: said angle $\alpha$ is such that cosine $\alpha$ is equal to the ratio of the speed of propagation of said current wave along the axis of said parabolas at the speed of propagation of said emission radiation of said gas in the direction of said slot.

7. The generator according to claim 1, wherein: each half parabola for at least the first metallic plate comprises a wave reflector constituted by a cutaway part limited by an arc of a circle substantially centered on said pseudo-focus, and wherein the pseudo-apexes of said half parabola of said arc of a circle being arranged on opposite sides of said pseudo-focus.

* * * * *